March 10, 1970  J. B. NOVAK  3,499,522
LOADING APPARATUS
Filed Dec. 15, 1967  6 Sheets-Sheet 1
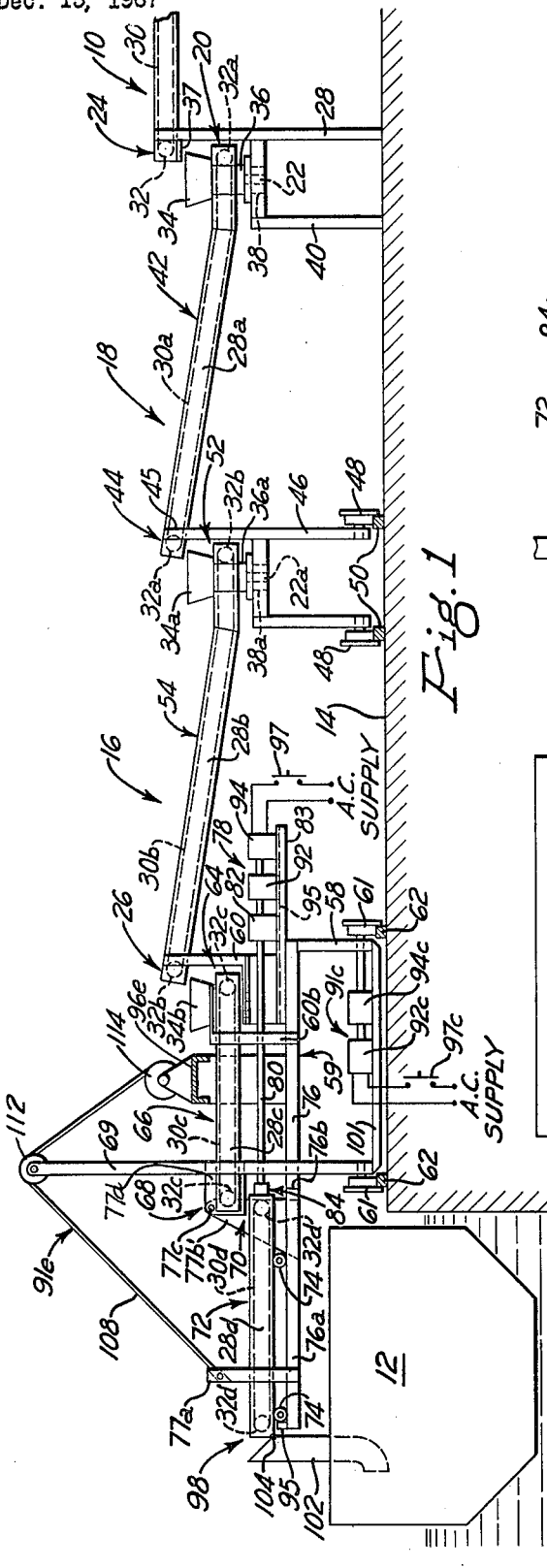
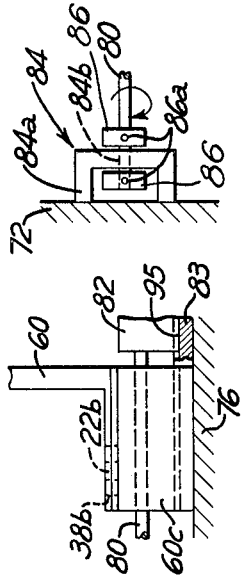
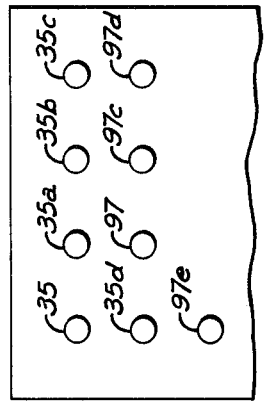
INVENTOR.
JOSEPH B. NOVAK
BY
ATTORNEY.

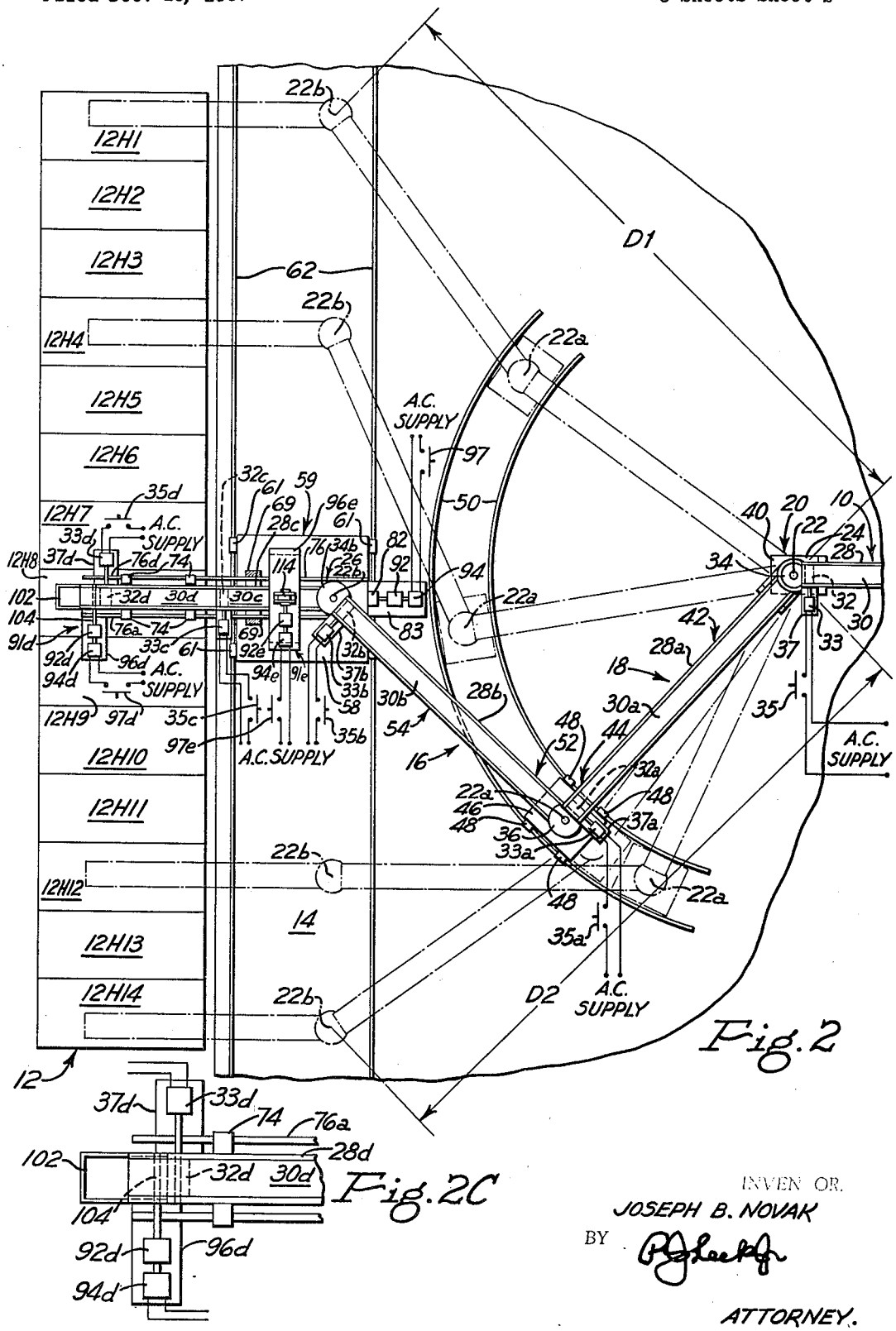

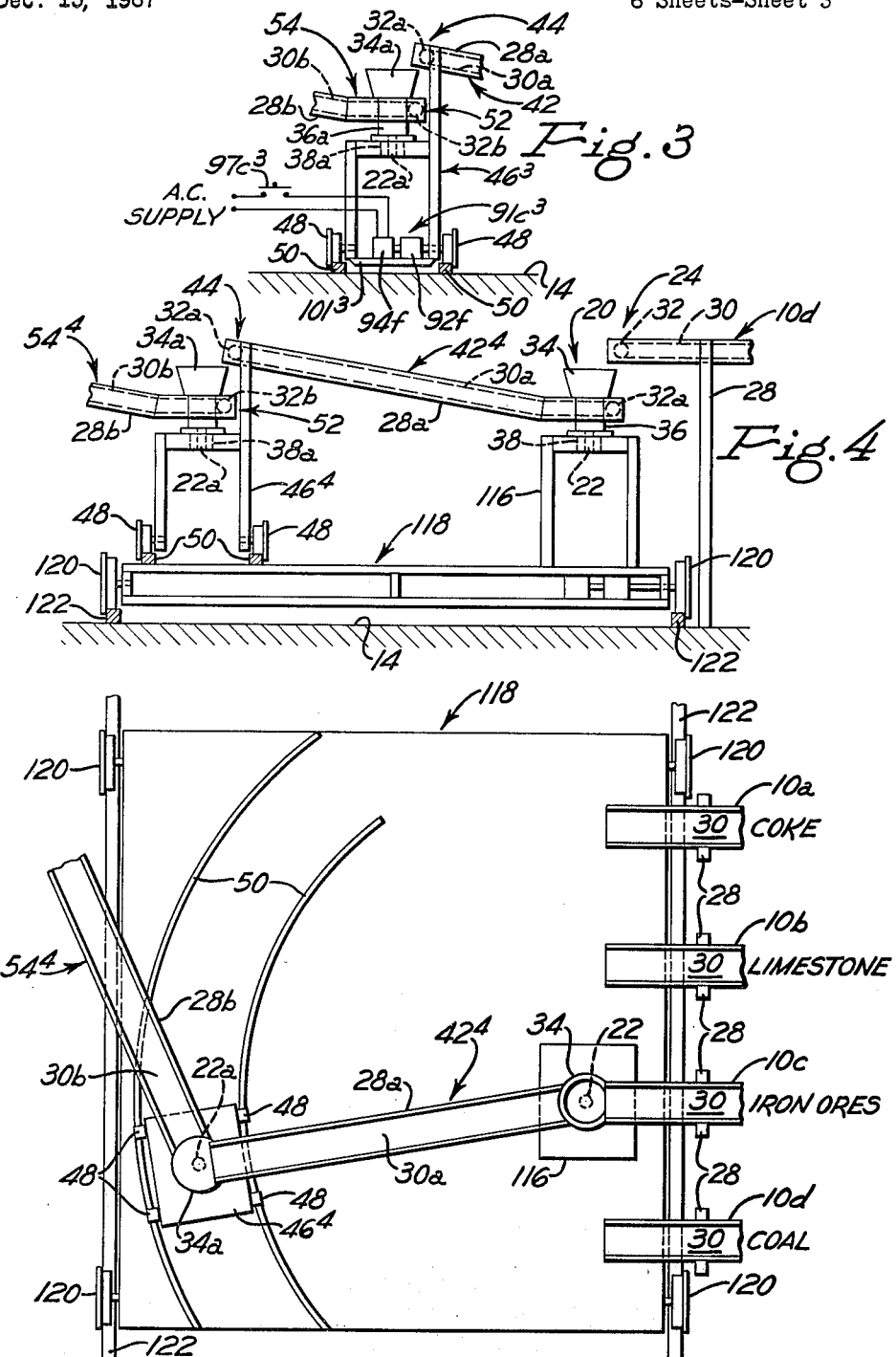

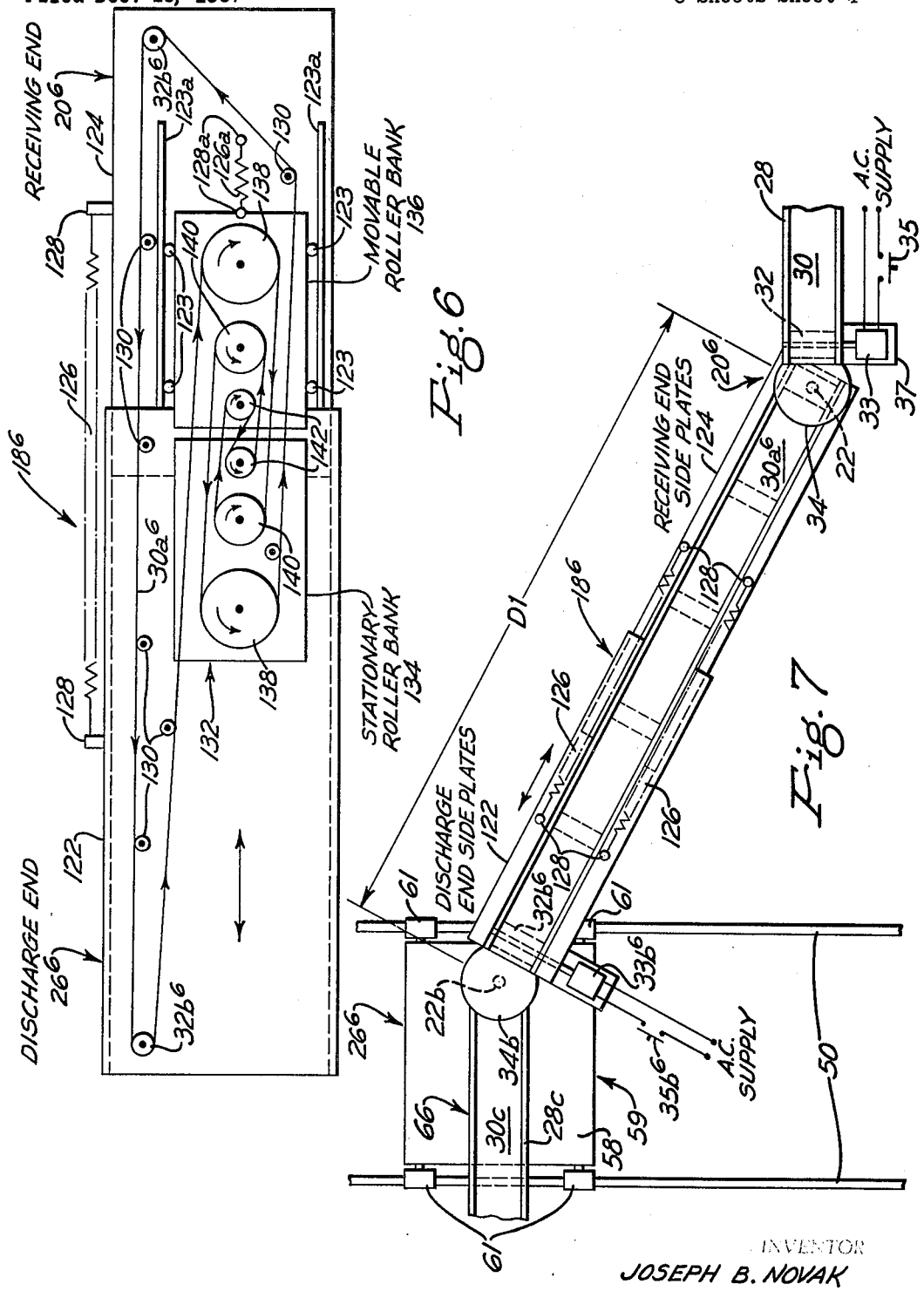

March 10, 1970  J. B. NOVAK  3,499,522
LOADING APPARATUS

Filed Dec. 15, 1967  6 Sheets-Sheet 5

INVENTOR.
JOSEPH B. NOVAK
BY
ATTORNEY.

March 10, 1970     J. B. NOVAK     3,499,522

LOADING APPARATUS

Filed Dec. 15, 1967     6 Sheets-Sheet 6

INVENTOR.
JOSEPH B. NOVAK
BY
ATTORNEY.

3,499,522
LOADING APPARATUS
Joseph B. Novak, Carnegie Borough, Pa., assignor to United States Steel Corporation, a corporation of Delaware
Filed Dec. 15, 1967, Ser. No. 690,962
Int. Cl. B65g 47/34, 47/74
U.S. Cl. 198—88                                     16 Claims

ABSTRACT OF THE DISCLOSURE

This invention relates to loading apparatus for transferring either dry or fluid material from a material source to a storage means, such as vessel or the like, and having a reciprocating conveyor means reciprocable along the storage means to feed fluid material from the discharge end of the reciprocating conveyor means to the storage means. The receiving end of the reciprocating conveyor means is pivotably connected to the discharge end of an oscillating conveyor means. The receiving end of the oscillating conveyor means is pivotable adjacent the material source. An improved extensible type oscillating conveyor means is also provided.

BACKGROUND OF THE INVENTION

Heretofore, dry fluid materials, such as limestone, coal, coke, iron ore and the like, have been loaded into vessels by means of loading devices utilizing either chutes and/or conveyors. These conventional loading devices do not load adjacent hatches of the vessel consecutively, thus often causing a deleterious list of the vessel. Such conventional devices for loading vessels are basically of two types, namely the stationary type and the traveling type.

The stationary type of loading device remains in a fixed location on the dock, and consists of either a conveyor or a declined triangularly shaped pan for feeding such fluid material to a hatch loading chute, which hatch loading chute delivers the material into the vessel hatches. If a conveyor is used, it is generally retractable to accommodate various vessels widths. If a declined pan is used, the material is fed onto the pan at the dock side and is then fed by gravity across the pan and into a chute for delivering the material into the hatches. Various vessel widths are accommodated by hinging the chute at the pan and swinging the chute inboard or outboard as desired. When this stationary type is employed, proper distribution of the load over the vessel length requires the movement of the vessel back and forth along the dock for proper placement of the hatches below the vessel loading device. These required vessel movements are time-consuming and extend the vessel loading cycle accordingly.

The traveling type of loading device consists of a fixed position dock conveyor extending along the dock length, which dock conveyor receives the fluid material at one end and delivers it to a second or traveling conveyor positioned at a right angle to the dock conveyor and traveling on rails parallel to the dock conveyor. The rail mounting of the traveling conveyor permits spotting of the traveling conveyor over the desired vessel hatches. The fluid material received by the traveling conveyor is delivered to a hatch loading chute. The transfer of fluid material from the dock conveyor to the traveling conveyor requires a tripper arrangement, which tripper arrangement changes the direction of travel of the fluid material toward the hatch loading chute.

This traveling type of loading device has the following disadvantages:

(1) It requires the expense and operation of a tripper arrangement; and (2) When the traveling conveyor is required to move along the dock toward the input or receiving end of the dock conveyor, the fluid material on the dock conveyor must be removed so that the tripper arrangement can be moved in the direction opposed to the direction of the fluid material flow on the dock conveyor.

Removal of this fluid material from the dock conveyor requires either (a) a secondary conveyor, paralleling the dock conveyor, which secondary conveyor can receive the fluid material removed from the dock conveyor and feed it back into the system, or (b) a bin located at the end of the dock conveyor opposite the input end thereof, which bin can receive and store the removed fluid material. Such bins must be emptied periodically and the fluid material loaded back into the system. Both of these methods are time-consuming and require the above-described secondary mechanisms.

Conventional loading apparatus are of the type discussed above and are shown in the following U.S. Patents: 855,425, Arden, May 28, 1907; 1,266,475, Hunt, May 14, 1918; 1,446,124, Lichtenberg, Feb. 20, 1923; 1,456,715, Reck, May 29, 1923; 2,623,625, Rosetz, Dec. 30, 1952; 2,649,185, Lichtenberg, Aug. 18, 1953; 2,757,782, Davis, Aug. 7, 1956; 2,797,824, Anshutz, July 2, 1957; 2,798,587, Bergmann, July 9, 1957; 2,848,100, Jasper, Aug. 19, 1958; 3,003,611, Pelzer, Oct. 10, 1961; 3,052,364, Pelzer, Sept. 4, 1961; 3,107,795, Young et al. Oct. 22, 1963; 3,137,398, Steffensen, June 16, 1964; 3,152,732, Schulman et al., Oct. 13, 1964; 3,185,327, Smith, Jr., et al., May 25, 1965; and 3,198,353, McDowell, Aug. 3, 1965.

OBJECTS OF THE INVENTION

It is the general object of this invention to avoid and overcome the foregoing and other difficulties of and objections to prior art practices by the provision of an improved traveling type loading apparatus which:

(1) Eliminates the need for a tripper mechanism to direct fluid material from the dock conveyor to the traveling conveyor;

(2) Eliminates the need for recirculating the fluid material into the conveyor system;

(3) Requires less conveyor length than conventional loaders;

(4) Accommodates vessels of various lengths and widths; and (5) Does not require movement of the vessel being loaded during the loading operation.

BRIEF SUMMARY OF THE INVENTION

The aforesaid objects of this invention, and other objects which will become apparent as the description proceeds, are achieved by providing apparatus for transferring fluid material from a material source having a discharge end to an elongated storage means. This apparatus has an oscillting conveyor means having a receiving end pivotable adjacent the discharge end of the material source and also having a discharge end. A reciprocating conveyor means is reciprocable along the elongated storage means and has a receiving end and a discharge end. The discharge end of the reciprocating conveyor means is disposed adjacent the elongated storage means and the receiving end of the reciprocating conveyor means is pivotably connected to the discharge end of the oscillating conveyor means. Drive means are connected to one of the reciprocating conveyor means and the oscillating conveyor means for causing the discharge end of the reciprocating conveyor means to feed fluid material along the length of the elongated storage means. An improved oscillating conveyor means is also provided.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIGURE 1 is a side elevational view of the improved apparatus of this invention for transporting fluid material from a material source to an elongated storage means with portions of the individual conveyor drive means removed for clarity;

FIGURE 1A is an enlarged fragmentary side elevational view of a coupling between a shuttle conveyor and its drive means;

FIGURE 2 is a plan view of the apparatus shown in FIGURE 1 with portions of the superstructure of the apparatus removed for clarity and to show more clearly the various conveyors therebeneath;

FIGURE 2A is a side elevational view of the control panel for the apparatus shown in FIGURES 1 and 2;

FIGURE 2B is a fragmentary side elevational view of the pivotable connection between the discharge end of the oscillating conveyor means and the receiving end of the reciprocating conveyor means;

FIGURE 2C is an enlarged fragmentary plan view of the drive means for the telescopic chute 102 and the belt for the shuttle conveyor;

FIGURE 3 is a fragmentary side elevational view of an alternative embodiment of a first movable carriage of an oscillating conveyor means and showing the drive means for the apparatus connected to the first movable carriage;

FIGURE 4 is a fragmentary side elevational view of an alternative embodiment of the apparatus showing the first oscillating conveyor and the first movable carriage movable adjacent a plurality of material sources;

FIGURE 5 is a plan view of the alternative embodiment shown in FIGURE 4;

FIGURE 6 is a fragmentary side elevational view partially in vertical section of an alternative embodiment of the apparatus showing an extensible conveyor as the oscillating conveyor means;

FIGURE 7 is a plan view of the alternative embodiment shown in FIGURE 6; and

Figure 8:
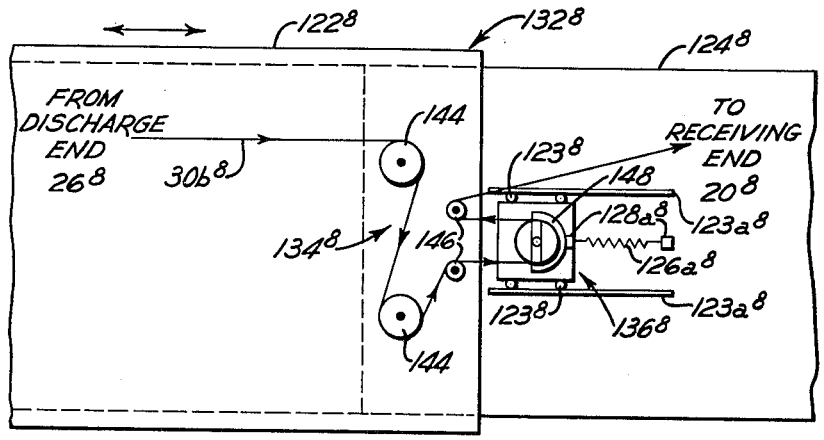
FIGURES 8–12 are fragmentary side elevational views similar to FIGURE 6 of alternative embodiment of a conveyor belt storage device for the extensible conveyor of FIGURES 6 and 7.

Although the principles of this invention are broadly applicable to the transfer of a fluid material from a material source to an elongated storage means, this invention is particularly adapted for use in conjunction with the transfer of dry fluid material, such as lump, pellet or granulated material in the form of coal, coke, iron ore, limestone and the like, to a vessel and hence it has been so illustrated and will be so described.

DETAILED DESCRIPTION

With specific reference to the form of this invention illustrated in the drawings, and referring particularly to FIGURES 1 and 2, an apparatus for transferring liquid or dry fluid material, such as lump, pellet or granulated material (i.e. coal, iron ore, limestone, coke and the like) from a material source, such as a source conveyor 10, to an elongated storage means, such as a vessel 12, disposed alongside a dock 14, is indicated generally by the reference numeral 16.

Referring generally to the structure and operation of the apparatus 16 (FIGURES 1 and 2), such apparatus 16 has an oscillating conveyor means 18 having a receiving end 20 pivotable at 22 (FIGURE 1) adjacent a discharge end 24 of the source conveyor 10. The oscillating conveyor means 18 also has a discharge end 26.

SOURCE CONVEYOR 10

As shown in the right-hand portions of FIGURES 1 and 2, the source conveyor 10 has a stationary frame 28 and an endless belt 30 extending around and supported by rollers 32 journaled in the frame 28. Only one roller 32 is shown in FIGURE 1. The structure utilized to drive the belt 30 of the source conveyor 10 is the roller 32 powered by a motor 33 (FIGURE 2), which motor 33 is connected through a push button 35 (FIGURES 2 and 2A) to a voltage supply indicated by the legend "AC SUPPLY." The motor 33 is mounted on a side mounting plate 37 extending from the frame 28.

OSCILLATING CONVEYOR MEANS 18

The receiving end 20 (FIGURES 1 and 2) of the oscillating conveyor means 18 and a hopper 34 (disposed between the receiving end 20 of the oscillating conveyor means 18 and the discharge end 24 of the source conveyor 10) are mounted on an upper frame 36 (FIGURE 1) pivotable on the pivot or spindle 22, which spindle 22 is journaled in a bearing 38 (FIGURE 1) mounted on an extension 40 of the frame 28 of the source conveyor 10. This oscillating conveyor means 18 (FIGURES 1 and 2) has a first oscillating conveyor 42, the receiving end of which is the receiving end 20 of the oscillating conveyor means 18.

FIRST OSCILLATING CONVEYOR 42

Such first oscillating conveyor 42 (FIGURES 1 and 2) has a discharge end 44 pivotable by means of a bracket 45 on the pivot 22a (FIGURE 1) in a bearing 38b in a first movable carriage 46 having wheels 48 which ride on arcuate rails 50. Fluid material leaving the discharge end 44 of the first oscillating conveyor 42 is fed into a hopper 34a mounted on an upper frame 36a.

The drive means for the first oscillating conveyor 42 has an endless belt 30a extending around and supported by rollers 32a journaled in a frame 28a of the first oscillating conveyor 42, which frame 28a is mounted on its right-hand end (FIGURES 1 and 2) on the pivotable upper frame 36 associated with the hopper 34 and on its left-hand end on the bracket 45 on the movable carriage 46. The left-hand roller 32a (FIGURE 2) is driven by a motor 33a operable by a push button 35a.

SECOND OSCILLATING CONVEYOR 54

So that the upper frame 36a (FIGURES 1 and 2) and a receiving end 52 of a second oscillating conveyor 54 are pivotable on the movable carriage 46, such upper frame 36a and the receiving end 52 of the second oscillating conveyor 54 are also mounted on the spindle 22a (FIGURE 1).

This second oscillating conveyor 54 (FIGURES 1 and 2) is similar in structure to the first oscillating conveyor 42 and has a discharge end (which is the discharge end 26 of the oscillating conveyor means 18) pivotably mounted on a second movable carriage 58 of a reciprocating conveyor means 59. To provide such pivotable mounting for the discharge end 26 of the second oscillating mounting for the discharge end 26 of the second oscillating conveyor 54, a bracket 60 for supporting such discharge end 26 of the second oscillating conveyor 54 is pivotable on a spindle 22b (FIGURE 2B) journaled in a bushing 38b in a second bracket 60c, which bracket 60c bridges a screw 80 of a shuttle conveyor drive means 78, hereinafter described in detail.

The second oscillating conveyor 54 has an endless belt 30b extending around and supported by rollers 32b journaled in a frame 28b, the frame 28b being supported at its right-hand end (FIGURES 1 and 2) by the upper frame 36a associated with the hopper 34a and at its left-hand end by the bracket 60. The left-hand roller 32b (FIGURE 2) is driven by a motor 33b which is operable by a push button 35b.

For the purpose of reciprocating the second movable hatch 12H14). This construction prevents alignment of the first oscillating conveyor 42 and the second oscillating conveyor 54 in a straight line, thus eliminating any buckling of such conveyors 42, 54 at their pivot or junction (i.e. the spindle 22a) and thereby providing positive control of the direction of movement of the junction or spindle 22a during movement of the junction 22b between the second oscillating conveyor 54 and the first conveyor 66 of the reciprocating conveyor means 59 on the rails 62.

Assuming that loading of the vessel 12 initiates in the hatch 12H1 (FIGURE 2), the movement of the junction or spindle 22b (FIGURE 2) toward the opposite end (in the lower portion of FIGURE 2) of the dock 14 will cause the junction 22a to move counterclockwise, as viewed in FIGURE 2, along the arcuate rails 50 until the second oscillating conveyor 54 is perpendicular to the rails 62, as illustrated by the dotted line position adjacent the hatch 12H12. Further movement of the junction 22b toward the hatch 12H14 will cause the junction 22a to move clockwise (FIGURE 2) along the arcuate rails 50 until the hatch 12H14 is reached.

Assuming that vessel loading initiates at hatch 12H14, the movement of the junction 22b toward the opposite end (in the upper portion of FIGURE 2) of the dock 14 will cause the junction 22a to move counterclockwise, as viewed in FIGURE 2, along the arcuate rails 50 until the second oscillating conveyor 54 is perpendicular to the rails 62 as illustrated by the dotted line position of the apparatus 16 over the hatch 12H12. Further movement of junction 22b toward the hatch 12H1 will cause the junction 22a to move clockwise (FIGURE 2) along the arcuate rails 50 until the hatch 12H1 is reached.

ALTERNATIVE EMBODIMENTS

As shown in FIGURE 3, the first movable carriage $46^3$ of the oscillating conveyor means $18^3$, not shown in FIGURE 3, has a drive means $91c^3$ (i.e. motor $94f$ and gear reduction unit $92f$) mounted on a bottom base plate $101^3$ of the first movable carriage $46^3$ and controlled by the push button $97c^3$.

In FIGURES 4 and 5, the first oscillating conveyor $42^4$ has a frame 116 for its receiving end 20. The frame 116 and the rails 50 for the first movable carriage $46^4$ are mounted on a third movable carriage 118 having wheels 120 riding on rails 122 on the dock 14, thus enabling the apparatus $16^4$ to receive fluid material from a plurality of material sources, such as a coke source conveyor 10a, limestone source conveyor 10b, iron ore source conveyor 10c and a coal source conveyor 10d.

Referring to FIGURES 6 and 7, the oscillating conveyor means $18^6$ is an extensible conveyor pivoted on the spindles 22b and 22. This extensible conveyor $18^6$ has movable discharge end side plates 122 and stationary receiving end side plates 124, the movable discharge end side plates 122 being slidable on the stationary discharge end side plates 124 and being biased together by bias means, such as heavy springs 126, extending between posts 128 mounted on the plates 122, 124 for maintaining the belt $30a^6$ in tension. The belt $30a^6$ is supported by and extends around guide rollers 130, the drive roller $32b^6$ on the discharge or left end $26^6$ (FIGURE 6), the guide roller 32b on the receiving end $20^6$ and other guide rollers 130 to a belt storage device 132.

This belt storage device 132 comprises a stationary roller bank 134 (FIGURE 6) mounted on the discharge end side plates 122 and a movable roller bank 136 reciprocably movable on rollers 123 riding on a track 123a on the stationary receiving end side plates 124. Each bank 134, 136 has a large roller 138, medium roller 140 and small roller 142. As shown in FIGURE 6 the belt $30b^6$ moves in the direction of the arrows around the above-described rollers of the extensible conveyor $18^6$. The movable roller bank 136 is biased away from the stationary roller bank 134 by biasing means, such as a spring 126a extending between posts 128a to provide a variable distance D1 (FIGURE 7) between the pivots 22, 22b.

In the conveyor belt storage device $132^8$ of FIGURE 8 the stationary bank of rollers $134^8$ has a plurality of fixed guide rollers 144, 146 mounted on the discharge end side plates $122^8$ and a movable roller 148 reciprocable on the receiving end side plates $124^8$ and biased by a spring $126a^8$ away from the stationary bank of rollers $134^8$.

Figure 9:
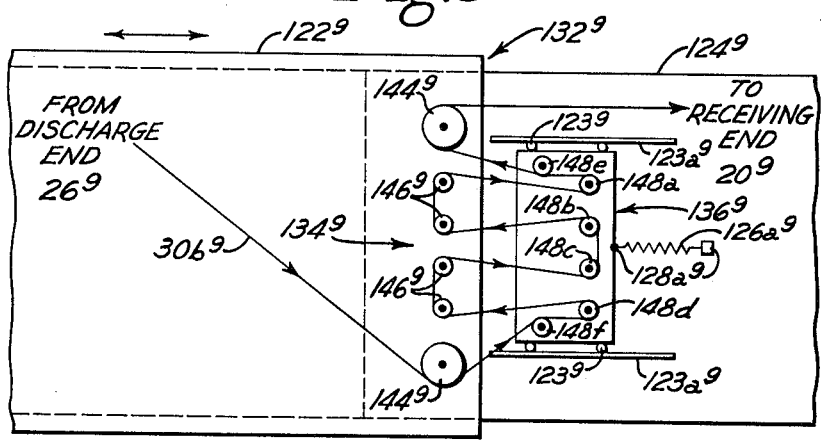

The movable roller bank $136^9$ (FIGURE 9) shows a plurality of movable rollers 148a, 148b, 148c etc. cooperating partially in tandem with the guide rollers $144^9$, $146^9$ of the stationary roller bank $134^9$.

Figure 10:
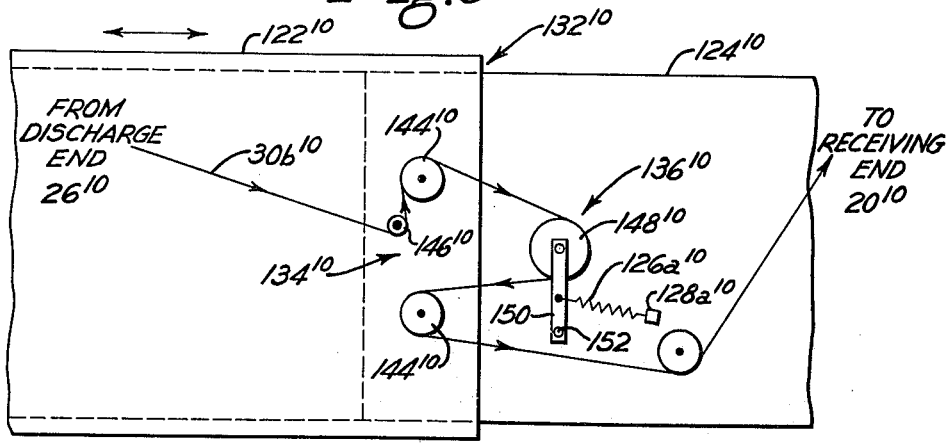

In FIGURE 10 the stationary roller bank $134^{10}$ has the guide rollers $144^{10}$ and a guide roller $146^{10}$. The movable roller bank $136^{10}$ utilizes a movable roller $148^{10}$ mounted on an arm 150, which arm 150 is pivotable at 152 on the stationary receiving end side plates $124^{10}$ and is biased by a spring $126a^{10}$.

Figure 11:
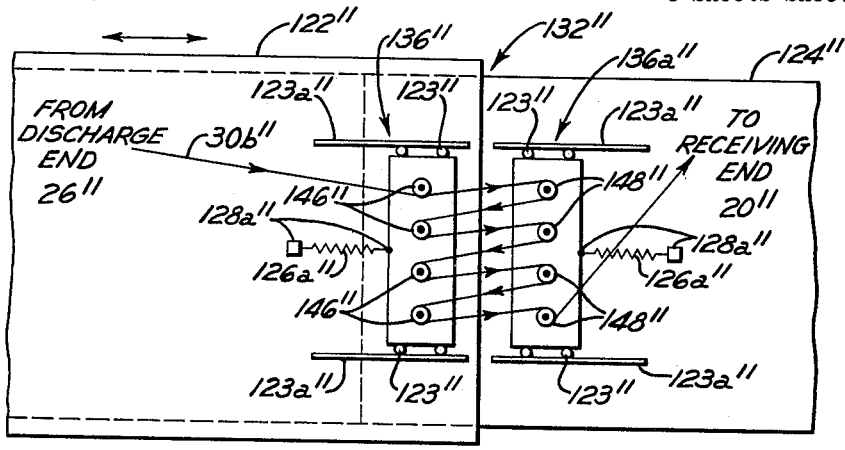

FIGURE 11 shows two movable roller banks $136^{11}$, $136a^{11}$ having horizontally opposed sets of rollers $146^{11}$ and $148^{11}$ wherein the first movable roller bank $136^{11}$ is aligned longitudinally with the second movable roller bank $136a^{11}$.

Figure 12:
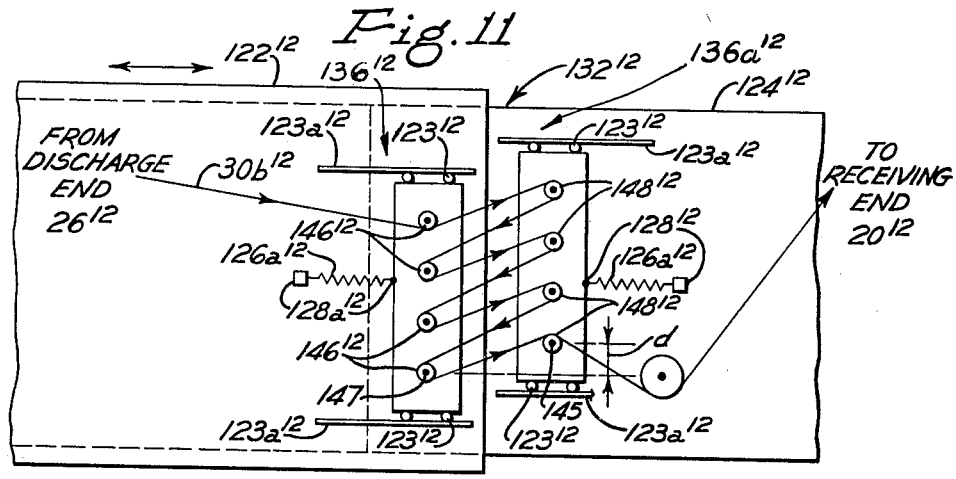

FIGURE 12 shows diagonally disposed sets of rollers $146^{12}$ and $148^{12}$ for the purpose of increasing storage of the belt $30b^{12}$ per unit of cross-sectional area with the shafts 145 of the rollers $148^{12}$ offset a distance $d$ from the shafts 147 of the rollers $146^{12}$.

Alternatively by replacing the flat surface of the belts of 30, 30a etc. (FIGURE 1) with a V- or U-shaped cross section the apparatus 16, $16^3$ etc. can be adapted to transfer liquid fluid material, such as a slurry of coal and the like.

SUMMARY OF THE ACHIEVEMENT OF THE OBJECTS OF THE INVENTION

It will be recognized by those skilled in the art that the objects of this invention have been achieved by providing an improved apparatus for transferring liquid or dry fluid material from a material source to an elongated storage means. This apparatus eliminates the need for a conventional tripper mechanism to direct fluid material from the dock conveyor to a traveling conveyor, eliminates the need for recirculating the fluid material into the conveyor system, requires less conveyor length than conventional loaders, accommodates vessels of various lengths and widths, and does not require the movement of the vessel being loaded during the loading operation.

While in accordance with the patent statutes preferred and alternative embodiments of this invention have been illustrated and described in detail, it is to be particularly understood that the invention is not limited thereto or thereby.

I claim:

1. Apparatus for transferring fluid material from a material source having a discharge end to an elongated storage means, said apparatus having:
    (a) a first oscillating conveyor having a receiving end pivoted at a first pivot adjacent said discharge end of said material source,
    (b) a first movable carriage oscillatable with respect to said discharge end of said material source,
    (c) said first oscillating conveyor having a discharge end pivoted at a second pivot on said first movable carriage,
    (d) a second oscillating conveyor having a receiving end pivoted on said first movable carriage and in registry with said discharge end of said first oscillating conveyor,
    (e) a second movable carriage reciprocable along said elongated storage means,
    (f) said second oscillating conveyor having a discharge end pivoted at a third pivot on said second movable carriage,
    (g) the sum of the distance between said first pivot and said second pivot and the distance between said second pivot and said third pivot being greater than the straight line distance between said first pivot and said carriage 58, such second movable carriage 58 has wheels 61 (FIGURES 1 and 2) riding on rails 62 disposed substantially parallel to the edge of the dock 14 and the vessel 12.

RECIPROCATING CONVEYOR MEANS 59

The discharge end 26 of the second oscillating conveyor 54 feeds fluid material through a hopper 34b (mounted by a bracket 60b (FIGURE 1) on the second movable carriage 58) and onto a receiving end 64 (FIGURE 1) of a first conveyor 66 of the reciprocating conveyor means 59, which receiving end 64 is mounted by means of its frame 28c on the bracket 60b.

FIRST CONVEYOR 66

Such first conveyor 66 is similar in structure to the first oscillating conveyor 42 and the second oscillating conveyor 54 and has its discharge end 68 mounted on side supports 69 (FIGURES 1 and 2) of the second movable carriage 58 and disposed above a receiving end 70 of a shuttle conveyor 72 of the reciprocating conveyor means 59. This first conveyor 66 has an endless conveyor belt 30c extending around and supported by rollers 32c (FIGURES 1 and 2), which rollers 32c are journaled in a frame 28c and are driven by a motor 33c operable by a push button 35c.

SHUTTLE CONVEYOR 72

As shown in FIGURES 1 and 2, this retractable shuttle conveyor 72 has wheels 74 riding on rails 76 and movable rail extensions 76a which rails 76 and rail extensions 76a abut at 76b (FIGURE 1).

The rail extensions 76a are carried by track supports 77a, 77b' (FIGURE 1), the track support 77b' being pivoted at 77c on plates 77d extending from the side supports 69 with only the rear plate 77d being shown in FIGURE 1. The track support 77a is connected to a cable 108 of a drive mechanism 91e, which cable 108 extends around a guide sheave 112 on the side supports 69 and is reeled in or out by a reel 114 (FIGURES 1 and 2) driven by a gear reduction unit 92e (FIGURE 2) and a reversible motor 94e. The motor 94e is controlled by a push button 97e. The reel 114, gear reduction unit 92e and motor 94e are mounted on a plate 96e upstanding from the second movable carriage 58. The shuttle conveyor 72 is similar in structure to the first conveyor 66 of the reciprocating conveyor means 59. This shuttle conveyor 72 has an endless belt 30d extending around rollers 32d journaled in the frame 28d and driven by a motor 33d operable by a push button 35d.

In order to selectively move the shuttle conveyor 72 between the fully extended or solid line position shown in FIGURE 1 and the retracted position not shown therein, a drive means 78 is provided.

SHUTTLE CONVEYOR DRIVE MEANS 78

This drive means 78 (FIGURES 1, 1A, and 2) has a screw 80 rotatable in a threaded block 82 mounted on a plate 83 extending from the second movable carriage 58 to permit reciprocable movement of the screw 80 with respect to the fixed threaded block 82. Such screw 80 is connected to the shuttle conveyor 72 by a coupling 84 (FIGURE 1A) having a collar 84a on the shuttle conveyor 72. The unthreaded or left-hand end of the screw 80 extends through an aperture 84b in the collar 84a and carries flanges 86 secured thereon by a fastener, such as a screw 86a, to permit rotation of the screw 80 within the coupling 84 and eliminates longitudinal relative movement therebetween. A gear reduction unit 92 and reversible motor 94 (disposed on a slide 95 in the side mounting plate 83 of the second movable carriage 58 and operable by a push button 97) drive the screw 80.

For the purpose of limiting the forward or discharge end movement of the shuttle conveyor 72, a bumper 95 (FIGURE 1) is mounted on the track extension 76a.

Alternatively the gear reduction unit 92 and motor 94 disposed on the slide 95 on the side mounting plate 83 can be mounted on the shuttle conveyor 72 and connected to one of the pairs of wheels 74 of such shuttle conveyor 72. In addition the shuttle conveyor carries a telescopic chute 102.

TELESCOPIC CHUTE 102

As shown in FIGURES 1 and 2, the telescopic chute 102 is pivotably mounted on the frame 28d at 104 and is oscillated by a drive means 91d (FIGURE 2) having a gear reduction unit 92d and an oscillating motor 94d operable by a push button 97d. The gear reduction unit 92d and oscillating motor 94d are mounted on a side plate 96d projecting from the track extension 76a.

For the purpose of moving the apparatus 16 along the rails 62 so that the discharge end 98 (FIGURE 1) of the shuttle conveyor 72 feeds the fluid material into a selected hatch 12H1, 12H2 etc. of the vessel 12, a drive means 91c is connected to one of the first movable carriage 46 for the oscillating conveyor means 18 and the second movable carriage 58 for the reciprocating conveyor means 59 (in this case to the second movable carriage 58 for the reciprocating conveyor means 59).

DRIVE MEANS 91c FOR THE SECOND MOVABLE CARRIAGE 58

This drive means 91c (FIGURE 1) for the second movable carriage 58 of the reciprocating conveyor means 59 is mounted on a bottom base plate 101 of the second movable carriage 58 and comprises a gear reduction unit 92c and motor 94c, which motor 94c is operable by a push button 97c.

CONTROL MEANS

As shown in FIGURE 1 and 2, the various above-described drives for the respective elements of the apparatus 16 are controlled by the above-described push buttons 35 etc., 97 etc. Referring to the control panel shown in FIGURE 2A, the following table shows the respective control push buttons.

Table I

| Push button reference numeral: | Associated drive |
|---|---|
| 35 | Drive means for the belt 30 of the source conveyor 10. |
| 35a | Drive means for the belt 30a of the first oscillating conveyor 42. |
| 35b | Drive means for the belt 30b of the second oscillating conveyor 54. |
| 35c | Drive means for the belt 30c of the first conveyor 66. |
| 35d | Drive means for the belt 30d of the shuttle conveyor 72. |
| 97 | Drive means 78 for reciprocating the shuttle conveyor 72. |
| 97c | Drive means 91c for the second movable carriage 58. |
| 97d | Drive means 91d for oscillating the telescopic chute 102. |
| 97e | Drive mechanism 91e for oscillating the rail extensions 76a. |

OPERATION

It will be understood by those skilled in the art (FIGURES 1 and 2) that the combined lengths of the first oscillating conveyor 42 and the second oscillating conveyor 54 exceed the straight line distance D1 (FIGURE 2) between the pivot 22 between the source conveyor 10 and the first oscillating conveyor 42 and the pivot 22b between the second oscillating conveyor 54 and the first conveyor 66 (when the apparatus 16 is disposed in the dotted line position adjacent hatch 12H1 of the vessel 12) and the distance D2 between such pivots 22, 22b (when the apparatus 16 is disposed in the dotted line position adjacent third pivot so that as said second movable carriage moves from one end of said elongated storage means to the other end of said elongated storage means, said second pivot will rotate in one direction until said second oscillating conveyor is substantially perpendicular to said elongated storage means and will thereafter rotate in the other direction thereby preventing buckling of said first oscillating conveyor and said second oscillating conveyor at said second pivot and providing positive control of the direction of movement of said second pivot during reciprocable movement of said third pivot along said elongated storage means, and (h) drive means connected to one carriage of said first movable carriage and said second movable carriage for causing said discharge end of said second oscillating conveyor to feed fluid material along the length of said elongated storage means.

2. The apparatus recited in claim 1 and having a reciprocating conveyor means on said second movable carriage and having a receiving end adjacent said discharge end of said second oscillating conveyor and a discharge end adjacent said elongated storage means.

3. The apparatus recited in claim 2 wherein said reciprocating conveyor means has a first conveyor on said second movable carriage and a shuttle conveyor reciprocable on said second movable carriage with respect to said first conveyor.

4. The apparatus recited in claim 2 wherein said reciprocating conveyor means has a chute oscillatable on said discharge end of said reciprocating conveyor means.

5. The apparatus recited in claim 2 and having a hopper adjacent said discharge end of said second oscillating conveyor for receiving said fluid material and feeding said fluid material to said receiving end of said reciprocating conveyor means.

6. The apparatus recited in claim 1 wherein said receiving end of said first oscillating conveyor is on a fixed pivot.

7. The apparatus recited in claim 1 wherein said first oscillating conveyor and said first movable carriage are on said frame and said first movable carriage is oscillatable on said frame.

8. The apparatus recited in claim 1 wherein said drive means is connected to said first movable carriage.

9. The apparatus recited in claim 1 wherein said drive means is connected to said second movable carriage.

10. Apparatus for transferring fluid material from a material source having a discharge end to an elongated storage means, said apparatus having:
(a) oscillating conveyor having a receiving end pivoted at a first pivot adjacent said discharge end of said material source, and
(b) a movable carriage reciprocable along said elongated storage means,
(c) said oscillating conveyor having a discharge end pivoted at a second pivot on said movable carriage,
(d) said oscillating conveyor having:
(1) stationary side plates on one end of said oscillating conveyor means,
(2) movable side plates on the other end of said oscillating conveyor means,
(a) said movable side plates being reciprocable with respect to said stationary side plates,
(3) a belt storage mechanism having a movable roller bank movable on said stationary side plates, and a stationary roller bank on said movable side plates, and
(4) biasing means extending between said movable roller bank and said stationary side plates.

11. The apparatus recited in claim 10 wherein said movable roller bank has a roller movable on said stationary side plates.

12. The apparatus recited in claim 10 wherein said movable roller bank has a plurality of rollers movable on said stationary side plates.

13. The apparatus recited in claim 10 wherein said movable roller bank has an oscillatable roller pivotably mounted on said stationary side plates.

14. The apparatus recited in claim 10 and having a second movable roller bank movable on said movable side plates, and having a second biasing means extending between said second movable roller bank and said movable side plates.

15. The apparatus recited in claim 14 wherein said first movable roller bank is aligned longitudinally with said second movable roller bank.

16. The apparatus recited in claim 14 wherein said first movable roller bank is offset longitudinally from said second movable roller bank to maximize storage capacity.

References Cited

UNITED STATES PATENTS

| | | | |
|---|---|---|---|
| 2,678,125 | 5/1954 | Bonney | 198—139 |
| 2,757,782 | 8/1956 | Davis | 198—86 |
| 3,003,611 | 10/1961 | Pelzer | 198—88 |
| 3,123,889 | 3/1964 | Watts | 198—90 |
| 3,137,398 | 6/1964 | Steffensen | 198—88 |
| 3,352,406 | 11/1967 | Long | 198—139 |

RICHARD E. AEGERTER, Primary Examiner

U.S. Cl. X.R.

198—139

UNITED STATES PATENT OFFICE

CERTIFICATE OF CORRECTION

Patent No. 3,499,522 March 10, 1970

Joseph B. Novak

It is certified that error appears in the above identified patent and that said Letters Patent are hereby corrected as shown below:

Column 2, line 57, "ocsillting" should read -- oscillating --. Column 4, lines 59 and 60, cancel "of the second oscillating mounting for the discharge end 26". Column 7, line 61, "32b" should read -- $32b^6$ --. Column 8, line 9, "tanden" should read -- tandem --.

Signed and sealed this 5th day of January 1971.

(SEAL)
Attest:

Edward M. Fletcher, Jr.
Attesting Officer

WILLIAM E. SCHUYLER, JR.
Commissioner of Patents